United States Patent
Webber et al.

(10) Patent No.: US 6,648,260 B2
(45) Date of Patent: Nov. 18, 2003

(54) SELECTABLE LOAD LIMITING SEAT RESTRAINT RETRACTOR

(75) Inventors: James Lloyd Webber, Shelby Township, MI (US); Connie M. Hardig, Auburn Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/178,101

(22) Filed: Jun. 24, 2002

(65) Prior Publication Data

US 2003/0019969 A1 Jan. 30, 2003

Related U.S. Application Data

(60) Provisional application No. 60/307,779, filed on Jul. 25, 2001.

(51) Int. Cl.$^7$ .............................................. B65H 22/28
(52) U.S. Cl. ................................................... 242/379.1
(58) Field of Search ....................... 242/379.1; 280/805, 280/806; 297/470, 471, 472, 478

(56) References Cited

U.S. PATENT DOCUMENTS

| | | | |
|---|---|---|---|
| 3,765,700 A | 10/1973 | Littmann | |
| 3,881,667 A | 5/1975 | Tandetzke | |
| 4,164,335 A | 8/1979 | Kondziola | |
| 4,314,680 A | 2/1982 | Takada | |
| 4,485,986 A | 12/1984 | Sugimoto | |
| 4,688,825 A | 8/1987 | Arbogast et al. | 280/806 |
| 4,726,540 A | 2/1988 | Ches et al. | 280/806 |
| 4,815,674 A | 3/1989 | Blake et al. | |
| 5,443,222 A | 8/1995 | Mödinger et al. | 242/379.1 |
| 5,538,098 A | 7/1996 | Sparhawk | 280/806 |
| 5,558,295 A | 9/1996 | Bauer | 242/379.1 |
| 5,607,118 A | 3/1997 | Dybro et al. | 242/379.1 |
| 5,611,498 A | 3/1997 | Miller, III et al. | 242/379.1 |
| 5,618,006 A | 4/1997 | Sayles | 242/379.1 |
| 5,785,269 A | 7/1998 | Miller, III et al. | 242/379.1 |
| 5,788,177 A | 8/1998 | Keller et al. | 242/379.1 |
| 5,788,281 A | 8/1998 | Yanagi et al. | 280/806 |
| 5,794,878 A | 8/1998 | Carpenter et al. | 242/381 |

(List continued on next page.)

FOREIGN PATENT DOCUMENTS

DE        29622181        5/1997

OTHER PUBLICATIONS

Copy of PCT International Search Report (Apr. 1, 2003).

*Primary Examiner*—John M. Jillions
(74) *Attorney, Agent, or Firm*—Scott A. McBain (57) ABSTRACT

A selectable load limiting seat restraint retractor for a seat restraint system in a vehicle includes a take-up spool connected to webbing of a seat restraint system for winding and unwinding the webbing. The selectable load limiting seat restraint retractor further includes a rotatable first torsion bar to provide a first level of load limiting on the webbing during an impact. The selectable load limiting seat restraint retractor includes a rotatable second torsion bar orientated parallel to the first torsion bar to provide a second level of load limiting on the webbing during an impact. The second level of load limiting is less than the first level of load limiting. The selectable load limiting seat restraint retractor further includes a selectable load limiting mechanism cooperating with the first torsion bar and the second torsion bar to select between the first level of load limiting and the second level of load limiting to provide digressive load limiting on the webbing during an impact.

40 Claims, 4 Drawing Sheets

U.S. PATENT DOCUMENTS

| | | | |
|---|---|---|---|
| 5,799,893 A | 9/1998 | Miller, III et al. | 242/379.1 |
| 5,887,814 A | 3/1999 | Matsuki et al. | 242/379.1 |
| 5,961,060 A | 10/1999 | Brambilla et al. | 242/379.1 |
| 5,967,441 A | 10/1999 | Kohlndorfer et al. | 242/379.1 |
| 6,019,392 A | 2/2000 | Karlow | 280/806 |
| 6,068,664 A | 5/2000 | Meyer et al. | 280/806 |
| 6,164,581 A | 12/2000 | Freeman et al. | 242/384.4 |
| 6,206,315 B1 * | 3/2001 | Wier | 242/379.1 |
| 6,213,510 B1 | 4/2001 | Suyama | 280/805 |
| 6,237,959 B1 | 5/2001 | Hison | 280/807 |
| 6,241,172 B1 | 6/2001 | Fugel et al. | 242/379.1 |
| 6,250,579 B1 | 6/2001 | Bannert et al. | 242/379.1 |
| 6,360,980 B1 | 3/2002 | Lee | 242/379.1 |
| 6,435,441 B1 | 8/2002 | Kajiyama et al. | 242/379.1 |

* cited by examiner

SELECTABLE LOAD LIMITING SEAT RESTRAINT RETRACTOR

CROSS-REFERENCE TO RELATED APPLICATION

The present invention claims the priority date of U.S. Provisional Patent Application Ser. No. 60/307,779, filed Jul. 25, 2001.

TECHNICAL FIELD

The present invention relates generally to seat restraint systems for vehicles and, more particularly, to a selectable load limiting seat restraint retractor for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap restraint or belt, a shoulder restraint or belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a load limiting retractor for the seat restraint system. During a front impact of the vehicle, the load limiting retractor locks and rapid deceleration causes forward movement of the occupant and the occupant to load the seat restraint webbing. These load limiting retractors are used to payout or unspool seat restraint webbing under a constant load and allow the occupant to decelerate with the vehicle, thus limiting high seat belt restraint loads, thereby improving occupant performance. However, these load limiting retractors offer only one level of load limiting and are usually designed for mid sized occupants.

Therefore, it is desirable to limit the amount of restraint load on an occupant during an impact for a seat restraint system in a vehicle. It is also desirable to select the amount of load limiting based on a size and mass of the occupant during an impact for a seat restraint system in a vehicle. It is further desirable to provide multiple levels of load limiting such as both a high level and a low level for various size occupants during an impact in a seat restraint system of a vehicle. Thus, there is a need in the art to provide a selectable load limiting seat restraint retractor that meets these desires.

SUMMARY OF THE INVENTION

It is, therefore, one object of the present invention to provide a new selectable load limiting seat restraint retractor for a seat restraint system in a vehicle.

It is another object of the present invention to provide a selectable load limiting seat restraint retractor for a seat restraint system in a vehicle that has multi-level load limiting.

It is yet another object of the present invention to provide a selectable load limiting seat restraint retractor for a seat restraint system in a vehicle having both a high level and a low level of load limiting.

To achieve the foregoing objects, the present invention is a selectable load limiting seat restraint retractor for a seat restraint system in a vehicle including a first housing for operative connection to vehicle structure. The selectable load limiting seat restraint retractor also includes a rotatable take-up spool connected to webbing of a seat restraint system for winding and unwinding the webbing. The selectable load limiting seat restraint retractor further includes a rotatable first torsion bar operatively connected to the first housing to provide a first level of load limiting on the webbing during an impact. The take-up spool is operatively connected to the first torsion bar. The selectable load limiting seat restraint retractor includes a rotatable second torsion bar operatively connected to the first housing and orientated parallel to the first torsion bar to provide a second level of load limiting on the webbing during an impact. The second level of load limiting is less than the first level of load limiting. The selectable load limiting seat restraint retractor further includes a selectable load limiting mechanism operatively cooperating with the first torsion bar and the second torsion bar to select between the first level of load limiting and the second level of load limiting to provide digressive load limiting on the webbing during an impact.

One advantage of the present invention is that a selectable load limiting seat restraint retractor is provided for a seat restraint system in a vehicle having a digressive load limit. Another advantage of the present invention is that the selectable load limiting seat restraint retractor achieves multi-level load limiting and provides the desired effect of digressive load limiting. Yet another advantage of the present invention is that the selectable load limiting seat restraint retractor offers a high peak load level early in an impact prior to airbag contact and digresses to a lower load level as an occupant is restrained by the airbag, thereby spreading the impact loading more evenly throughout the impact. Still another advantage of the present invention is that the selectable load limiting seat restraint retractor allows larger sized occupants to benefit by receiving a high load limit level throughout the impact and from the additional load carrying capability of the seat restraint system. A further advantage of the present invention is that the selectable load limiting seat restraint retractor allows smaller sized occupants to benefit from a lower load limit because these occupants are in most cases fully restrained by the airbag and little additional restraint from the webbing is necessary. Yet a further advantage of the present invention is that the selectable load limiting seat restraint retractor maintains critical packaging dimensions. Still a further advantage of the present invention is that the selectable load limiting seat restraint retractor has a high level of load limiting as a default with a low level of load limiting being selectable during an impact. Another advantage of the present invention is that the selectable load limiting seat restraint retractor has a load level response that starts high and ends lower, working in conjunction with the airbag to maximize performance for a mid sized occupant in a high severity impact.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
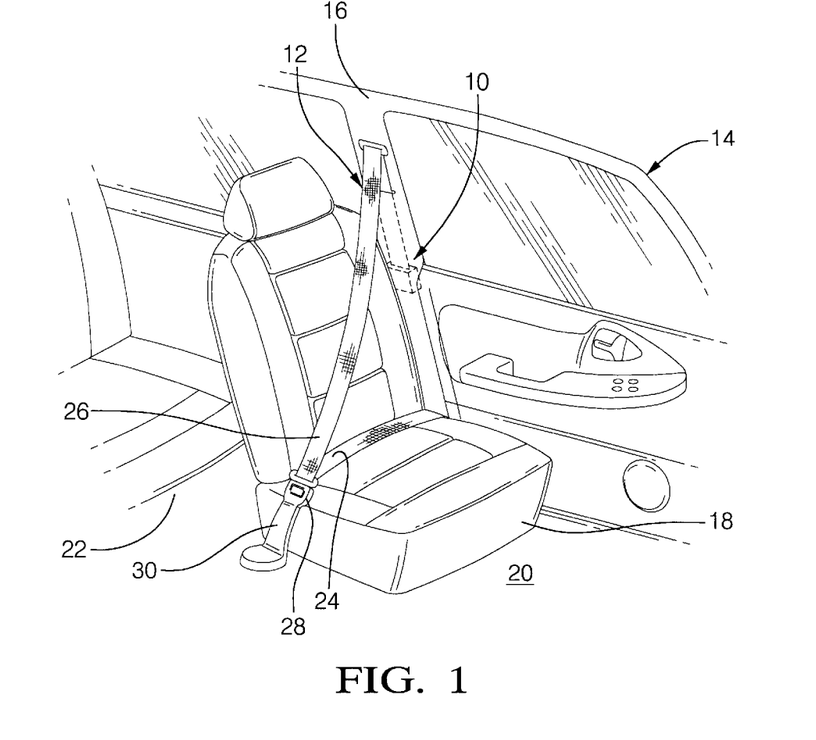
FIG. 1 is a perspective view of a selectable load limiting seat restraint retractor, according to the present invention, illustrated in operational relationship with a seat restraint system of a vehicle.

Referring to the drawings and in particular FIG. 1, one embodiment of a selectable load limiting seat restraint retractor 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row, or third row seat for the vehicle 14.

The vehicle 14 includes the seat restraint system 12 for restraining an occupant (not shown) in the seat 18. The seat restraint system 12 includes a latch tongue or plate 23 connected to an end of either one of a lap belt 24, shoulder belt 26, or both which have another end connected to the selectable load limiting seat restraint retractor 10. The seat restraint system 12 also includes a buckle assembly 28 connected by suitable means such as belt webbing 30 to the vehicle structure 20. The latch plate 23 is engageable and disengageable with the buckle assembly 28 as is known in the art. It should be appreciated that, except for the selectable load limiting seat restraint retractor 10, the seat restraint system 12 and vehicle 14 are conventional and known in the art.

Figure 2:
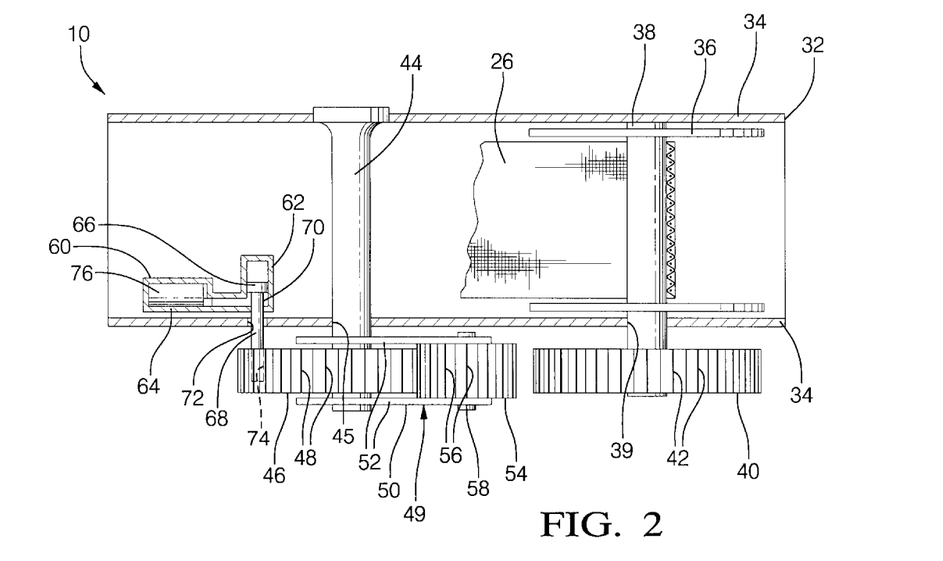
FIG. 2 is a fragmentary plan view of the selectable load limiting seat restraint retractor of FIG. 1.
Figure 3:
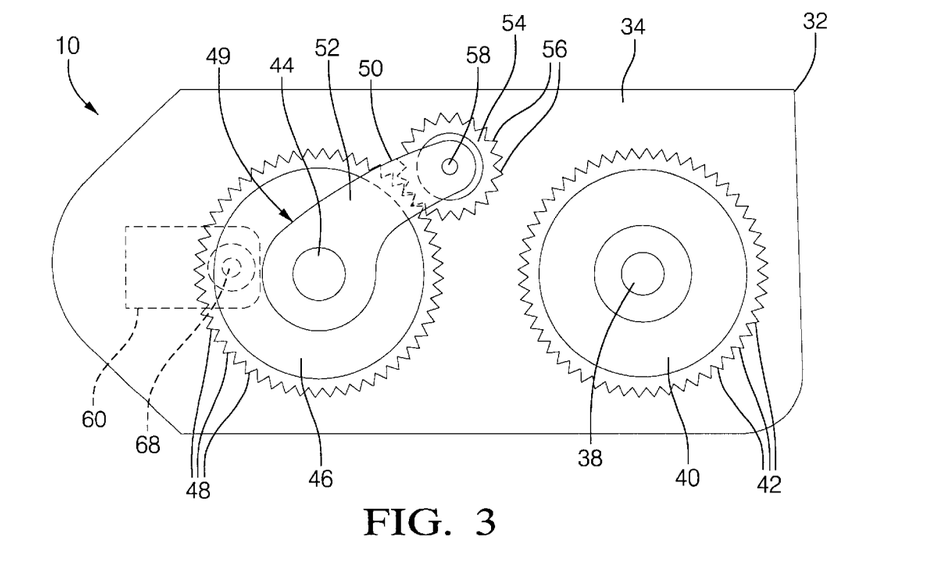
FIG. 3 is a side elevational view of the selectable load limiting seat restraint retractor of FIG. 1 illustrating a first operational state.

Referring to FIGS. 2 and 3, the selectable load limiting seat restraint retractor 10, according to the present invention, is connected, in one embodiment, to the shoulder belt 26. The selectable load limiting seat restraint retractor 10 includes a housing 32 having a base wall (not shown) and spaced apart sidewalls 34. The selectable load limiting seat restraint retractor 10 also includes a belt reel or take-up spool 36 disposed between the sidewalls 34 and connected by suitable means such as a slot (not shown) in the take-up spool 36 and a bar (not shown) through a loop (not shown) at the end of the shoulder belt 26 cooperating with the slot. The selectable load limiting seat restraint retractor 10 also includes a high level or first torsion bar or shaft 38 extending through a passageway (not shown) of the take-up spool 36. The first torsion bar 38 has one end rotatably attached to one of the sidewalls 34 and another end extending through an aperture 39 of the other sidewall 34 of the housing 32 such that the first torsion bar 38 and the take-up spool 36 are rotatable relative to the housing 32. The first torsion bar 38 has one end fixed to the take-up spool 36 and is a constant force limiting member that deforms inside the take-up spool 36, thus absorbing energy. The first torsion bar 38 is rated to provide a high level of load limiting such as approximately six kilonewtons (6 kN). It should be appreciated that the housing 32 is attached by suitable means (not shown) to either the vehicle body 16 or the seat 18. It should also be appreciated that the webbing of the shoulder belt 26 is connected to and wrapped around the take-up spool 36.

The selectable load limiting seat restraint retractor 10 also includes a retractor spring (not shown) disposed about one end of the first torsion bar 38. The retractor spring is of a spiral type having one end attached to the first torsion bar 38 and another end connected to the housing 32 as known in the art. The retractor spring may be enclosed by a spring housing (not shown) attached to the sidewall 34 of the housing 32. The retractor spring has a predetermined torque or tension and urges the first torsion bar 38 and take-up spool 36 in a predetermined direction to wind up the shoulder belt 26 on the take-up spool 36. It should be appreciated that the retractor spring is conventional and known in the art.

The selectable load limiting seat restraint retractor 10 also includes a primary or high level gear 40 rigidly or fixedly attached to and disposed about one end of the first torsion bar 38. The first gear 40 is disposed on the outside of one of the sidewalls 34 of the housing 32 on one side thereof. The first gear 40 is generally circular in shape and has a plurality of teeth 42 disposed circumferentially thereabout for a function to be described. It should be appreciated that the first gear 40 is secured onto the first torsion bar 38 by suitable means such as staking or press-fitting. It should also be appreciated that the first gear 40 and first torsion bar 38 rotate together as a unit.

The selectable load limiting seat restraint retractor 10 includes a low level or second torsion bar or shaft 44 having one end fixed to one of the sidewalls 34 of the housing 32 and another end extending through an aperture 45 of the other sidewall 34 of the housing 32. The second torsion bar 44 is spaced longitudinally from the first torsion bar 38. The second torsion bar 44 is rated to provide a low level of load limiting such as approximately three kilonewtons (3 kN). It should be appreciated that one end of the second torsion bar 44 is fixed to the housing 32 by suitable means such as staking. It should also be appreciated that the torsion bars 38 and 44 are oriented generally parallel to each other.

The selectable load limiting seat restraint retractor 10 also includes a secondary or low level gear 46 rigidly or fixedly attached to and disposed about one end of the second torsion bar 44. The second gear 46 is disposed on the outside of the sidewall 34 of the housing 32 on the same side as the first gear 40. The second gear 46 is generally circular in shape and has a plurality of teeth 48 disposed circumferentially thereabout for a function to be described. It should be appreciated that the second gear 46 is secured onto the second torsion bar 44 by suitable means such as staking or press-fitting. It should also be appreciated that the second gear 46 and second torsion bar 44 rotate together as a unit.

The selectable load limiting seat restraint retractor 10 includes a selectable load limiting mechanism, generally indicated at 49, cooperating with the first gear 40 and the second gear 46 to select between a first level of load limiting and a second level of load limiting to be described. The selectable load limiting mechanism 49 includes a pawl 50 connected to the second torsion bar 44. The pawl 50 has at least one, preferably a pair of arm members 52 spaced axially with the second gear 46 disposed therebetween. The arm members 52 extend radially outwardly and are connected to the second torsion bar 44 by suitable means (not shown) such as staking or press-fitting. It should be appreciated that the pawl 50 and second torsion bar 44 rotate together as a unit.

The selectable load limiting mechanism 49 also includes a third or idler gear 54 rotatably attached to one end of the pawl 50. The third gear 54 is disposed between the arm members 52 and rotatably connected thereto. The third gear 54 is generally circular in shape and has a plurality of teeth 56 disposed circumferentially thereabout for a function to be described. It should be appreciated that the third gear 54 is rotatably secured to the pawl 50 by suitable means such as a pin 58 extending through the arm members 52 and secured thereto by suitable means such as staking or press-fitting. It should also be appreciated that the third gear 54 rotates with the pawl 50 as a unit and that the third gear 54 rotates about the second gear 46 with the teeth 56 engaging the teeth 48.

The selectable load limiting seat restraint retractor 10 includes a housing 60 secured to the side wall 34 adjacent the second gear 46 by suitable means such as welding. The housing 60 has a first or piston portion 62 extending axially and a second or gas generation portion 64 extending radially from the piston portion 62 at a forward end thereof and having an enlarged diameter. The piston portion 62 and gas generation portion 64 are generally tubular in shape with a generally circular cross-sectional shape. The piston portion 62 may have an aperture (not shown) extending axially through an end thereof for a function to be described. The housing 60 is made of a metal material such as steel.

The selectable load limiting seat restraint retractor 10 further includes a piston 66 disposed in the piston portion 62 of the housing 60. The piston 66 is generally cylindrical in shape for sliding movement in the piston portion 62. The piston 66 is made of a metal material such as steel.

The selectable load limiting seat restraint retractor 10 includes a shaft or pin 68 disposed partially in the housing 60. The pin 68 is generally cylindrical in shape with a generally circular cross-sectional shape. The pin 68 extends axially and has one end connected to the piston 66 by suitable means such as welding and another end extending through an aperture 70 in the housing 60 and an aperture 72 in the sidewall 34 of the housing 32 and an aperture 74 in the second gear 46. The pin 68 is made of a metal material such as steel. It should be appreciated that the piston 66 and pin 68 may be integral, unitary, and one-piece. It should also be appreciated that the second gear 46 is held fixed relative to the housing 32 by the pin 68 passing through the sidewall 34 and the second gear 46.

The selectable load limiting seat restraint retractor 10 also includes a gas generator 76 disposed in the gas generation portion 64 of the housing 60. The gas generator 76 is a pyrotechnic device similar to that used to ignite inflators in inflatable restraint systems (e.g., squib) to expel a gas into the housing 60. The gas generator 76 includes an electrical connector (not shown) connected to a source of power (not shown) for activating the pyrotechnic device to expel the gas. It should be appreciated that the gas expelled by the pyrotechnic device of the gas generator 76 will move the piston 66 axially in the piston portion 62 of the housing 60. It should also be appreciated that the gas generator 76 may be a stored compressed gas used with an electrical trigger in place of a pyrotechnic device.

The selectable load limiting seat restraint retractor 10 may include a spring (not shown) disposed about the pin and interconnecting the pawl 50 and the housing 32 to urge the pawl 50 away from the first gear 40. It should be appreciated that the pawl 50 and spring are conventional and known in the art.

The selectable load limiting seat restraint retractor 10 further includes a vehicle or web sensing mechanism (not shown) connected by suitable means to the housing 32. The selectable load limiting seat restraint retractor 10 also includes a cam (not shown) operatively connected to the housing 32 and cooperating with the sensing mechanism and the pawl 50. Upon receiving an inertia force, the sensing mechanism pivots the cam to actuate the pawl 50. It should be appreciated that the sensing mechanism and cam are conventional and known in the art.

Figure 4:
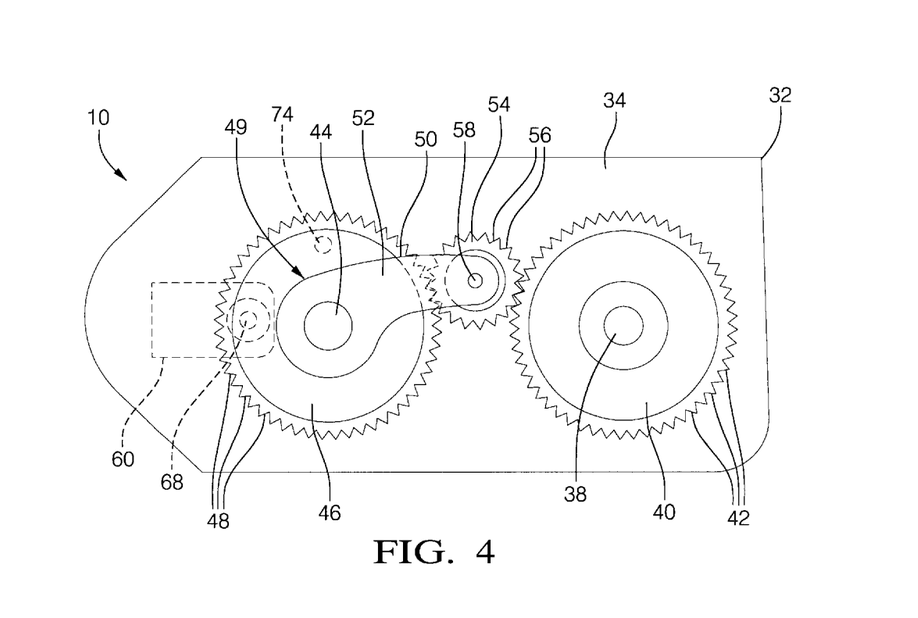
FIG. 4 is a view similar to FIG. 3 illustrating the selectable load limiting seat restraint retractor in a second operational state.

In operation of the selectable load limiting seat restraint retractor 10, an occupant (not shown) grasps the latch plate 23 and pulls on the lap belt 24 and shoulder belt 26. The shoulder belt 26 is unwound by the occupant from the take-up spool 36. The occupant engages the latch plate 23 with the buckle assembly 28 to restrain the occupant in the seat 18. When the vehicle 14 experiences a frontal impact or collision-indicating condition of at least a predetermined threshold level, the rapid deceleration causes the occupant to move forward and place a load on the webbing attached to the selectable load limiting seat restraint retractor 10. When the vehicle or web sensing mechanism (not shown) actuates a locking cam (not shown), this cam moves the pawl 50 with the third gear 54 into position between the first gear 40 and second gear 46.

When the pawl 50 is wedged between the first gear 40 and the second gear 46, all gear movement is locked. As webbing is pulled from the take-up spool 36, the first torsion bar 38 is twisted between the housing 32 and the inside of the take-up spool 36, resulting in deformation of the first torsion bar 38 and the high level load limiting. It should be appreciated that the first torsion bar 38 is twisted between end points, that is the first gear 40 attached to the first torsion bar 38, which is fixed, the third gear 54 and the second gear 46 attached to the second torsion bar 44, which is fixed, and the pin 68 fixed to the housing 32.

When a low level of load limiting is required, the gas generator 76 is fired which moves the pin 68 from the second gear 46. This allows rotation of the first gear 40, second gear 46, and third gear 54. The second torsion bar 44 is rigidly supported by the housing 32 on one end. Thus, when the third gear 54 is engaged, the rotation of the take-up spool 36 about the first torsion bar 38 is translated through the gear train and the second torsion bar 44 and onto its attachment to the housing 32. Because the second torsion bar 44 is rated for a low level of load limiting, the second torsion bar 44 will undergo twisting before the first torsion bar 38, resulting in a low level of load limiting provided to the occupant. It should be appreciated that the first torsion bar 38 rotates, first gear 40 attached to first torsion bar 38 rotates, third gear 54 rotates, second gear 46 attached to second torsion bar 44 rotates, and the second torsion bar 44 twists between end points, that is the end of the second torsion bar 44, which is fixed to the housing 32. It should be appreciated that the selectable load limiting seat restraint retractor 10 has digressive load limiting to payout seat belt webbing and allow the occupant to decelerate with the vehicle 14.

Referring to FIGS. 5 through 8, another embodiment, according to the present invention, of the selectable load limiting seat restraint retractor 10 is shown. In this embodiment, a selectable load limiting seat restraint retractor 110, according to the present invention, is connected to the shoulder belt 26. The selectable load limiting seat restraint retractor 110 includes a housing 132 having a base wall 133 and spaced apart sidewalls 134. The selectable load limiting seat restraint retractor 110 also includes a belt reel or take-up spool 136 disposed between the sidewalls 134 and connected by suitable means such as a slot (not shown) in the take-up spool 136 and a bar (not shown) through a loop (not shown) at the end of the shoulder belt 26 cooperating with the slot. The selectable load limiting seat restraint retractor 110 includes a high level or first torsion bar or shaft 138 extending through a passageway 137 of the take-up spool 136. The first torsion bar 138 has one end rotatably attached to one of the sidewalls 134 and another end connected to a locking bobbin 139 to be described extending through an aperture (not shown) of the other sidewall 134 of the housing 132 such that the first torsion bar 138, locking bobbin 139, and take-up spool 136 are rotatable relative to the housing 132. The first torsion bar 138 has one end fixed to the take-up spool 136 via the locking bobbin 139 and is a constant force limiting member that deforms inside the take-up spool 136, thus absorbing energy. The first torsion bar 138 is rated to provide a high level of load limiting such as approximately four kilonewtons (4 kN) to approximately six kilonewtons (6 kN). It should be appreciated that the housing 132 is attached by suitable means (not shown) to either the vehicle body 16 or the seat 18. It should also be appreciated that the webbing of the shoulder belt 26 is connected to and wrapped around the take-up spool 136.

The selectable load limiting seat restraint retractor 110 also includes a retractor spring (not shown) disposed about one end of the first torsion bar 138. The retractor spring is of a spiral type having one end attached to the first torsion bar 138 and another end connected to the housing 132 as known in the art. The retractor spring may be enclosed by a spring housing (not shown) attached to the sidewall 134 of the housing 132. The retractor spring has a predetermined torque or tension and urges the first torsion bar 138, locking bobbin 139, and take-up spool 136 in a predetermined direction to wind up the shoulder belt 26 on the take-up spool 136. It should be appreciated that the retractor spring is conventional and known in the art.

The selectable load limiting seat restraint retractor 110 includes a locking bobbin 139 rigidly or fixedly attached to and disposed about one end of the first torsion bar 138. The bobbin 139 is generally cylindrical in shape with a generally circular cross-sectional shape. The bobbin 139 is made of a metal material such as aluminum. It should be appreciated that the bobbin 139 is concentrically attached to the take-up spool 136. It should also be appreciated that the bobbin 139 is secured onto the take-up spool 136 and first torsion bar 138 by suitable means such as staking or press-fitting.

The selectable load limiting seat restraint retractor 110 also includes first or high-level gear 140 disposed about one end of the bobbin 139. The first gear 140 is disposed on the outside of one of the sidewalls 134 of the housing 132 on one side thereof. The first gear 140 is generally circular in shape and has a plurality of external teeth 142 disposed circumferentially thereabout for a function to be described. The first gear 140 also has a plurality of internal or ratchet teeth 143 disposed circumferentially thereabout for a function to be described. It should be appreciated that the locking bobbin 139 and first torsion bar 138 rotate together as a unit. It should also be appreciated that the locking bobbin 139 may rotate freely within the first gear 140.

The selectable load limiting seat restraint retractor 110 includes a low or second torsion bar or shaft 144 having one end fixed to one of the sidewalls 134 of the housing 132 and another end extending through an aperture (not shown) of the other sidewall 134 of the housing 132. The second torsion bar 144 is spaced longitudinally from the first torsion bar 138. The second torsion bar 144 is rated to provide a low level of load limiting such as approximately two kilonewtons (2 kN) to approximately three kilonewtons (3 kN). It should be appreciated that one end of the second torsion bar 144 is fixed to the housing 132 by suitable means such as welding. It should also be appreciated that the torsion bars 138 and 144 are oriented generally parallel to each other.

The selectable load limiting seat restraint retractor 110 further includes a second or low-level gear 146 rigidly or fixedly attached to and disposed about one end of the second torsion bar 144. The second gear 146 is disposed on the outside of the sidewall 134 of the housing 132 on the same side as the first gear 140. The second gear 146 is generally circular in shape and has a plurality of external teeth 148 disposed circumferentially thereabout for a function to be described. It should be appreciated that the second gear 146 is secured onto the second torsion bar 144 by suitable means such as staking or press-fitting. It should also be appreciated that the second gear 146 and second torsion bar 144 rotate together as a unit.

The selectable load limiting seat restraint retractor 110 includes a selectable load limiting mechanism, generally indicated at 149, cooperating with the first gear 140 and the second gear 146 to select between a first level of load limiting and a second level of load limiting to be described. The selectable load limiting mechanism 149 includes a locking pawl 150 pivotally connected to bobbin 139. The pawl 150 has at least one, preferably a plurality of teeth 151 spaced circumferentially for engagement with the internal teeth 143 of the first gear 140. It should be appreciated that the pawl 150 and bobbin 139 rotate together as a unit. It should also be appreciated that the pawl 150 may be held away from the teeth 143 of the first gear 140 by suitable means such as a spring (not shown).

The selectable load limiting mechanism 149 also includes a third gear or detent member 154 rigidly or fixedly attached to the second gear 146. The detent member 154 is disposed on the outside of the sidewall 134 of the housing 132 on the same side as the second gear 146. The detent member 154 is generally circular in shape and has a detent 155 extending therein for a function to be described. The detent member 154 is secured to the second gear 146 and the second torsion bar 144 by suitable means such as staking or press-fitting. It should be appreciated that the detent member 154 and second gear 146 are preferably a monolithic structure being integral, unitary, and one-piece. It should also be appreciated that the detent member 154 rotates with the second gear 146 as a unit.

The selectable load limiting mechanism 149 includes a lock bar or arm 180 pivotally connected to the sidewall 134 of the housing 132 by suitable means such as a pin 182. The lock arm 180 has at least one, preferably a pair of arm members 184 spaced axially with the sidewall 134 disposed therebetween. The arm members 184 extend radially outwardly and are connected one end by an end wall 185 to form a general "U" shape. The arm members 184 are connected at the other end to the sidewall 134 by the pin 182. One of the arm members 184 has a projection 186 to engage the detent 155 in the detent member 154. It should be appreciated that the arm members 184 rotate together as a unit.

The selectable load limiting seat restraint retractor 110 also includes a gas generator 176 secured to the sidewall 134 adjacent the second gear 146 by suitable means such as welding. The gas generator 176 is a pyrotechnic device similar to that used to ignite inflators in inflatable restraint systems (e.g., squib) to expel a gas. The gas generator 176 includes an electrical connector 177 connected to a source of power such as a controller (not shown) for activating the pyrotechnic device to expel the gas. The selectable load limiting seat restraint retractor 110 includes a piston or shaft 178 disposed in the gas generator 176. The piston 178 is generally cylindrical in shape with a generally circular cross-sectional shape for sliding movement in the gas generator 176. The piston 178 is made of a metal material such as steel. It should be appreciated that the gas expelled by the pyrotechnic device of the gas generator 176 will move the piston 178 axially to engage the end wall 185 and pivot the lock arm 180. It should also be appreciated that the gas generator 176 may be a stored compressed gas used with an electrical trigger in place of a pyrotechnic device.

The selectable load limiting seat restraint retractor 110 further includes a vehicle or web sensing mechanism (not shown) connected by suitable means to the housing 132. The selectable load limiting seat restraint retractor 110 may include a cam (not shown) operatively connected to the housing 132 and cooperating with the sensing mechanism and the pawl 150. Upon receiving an inertia force, the sensing mechanism pivots the cam to actuate the pawl 150. It should be appreciated that the sensing mechanism and cam are conventional and known in the art. It should also be appreciated that the selectable load limiting seat restraint retractor 10 may include a pretensioner (not shown). It should further be appreciated that the torsion bars 138 and 144 are linked through the gear train of gears 140 and 146, which may include more gears than the gears 140 and 146.

Figure 5:
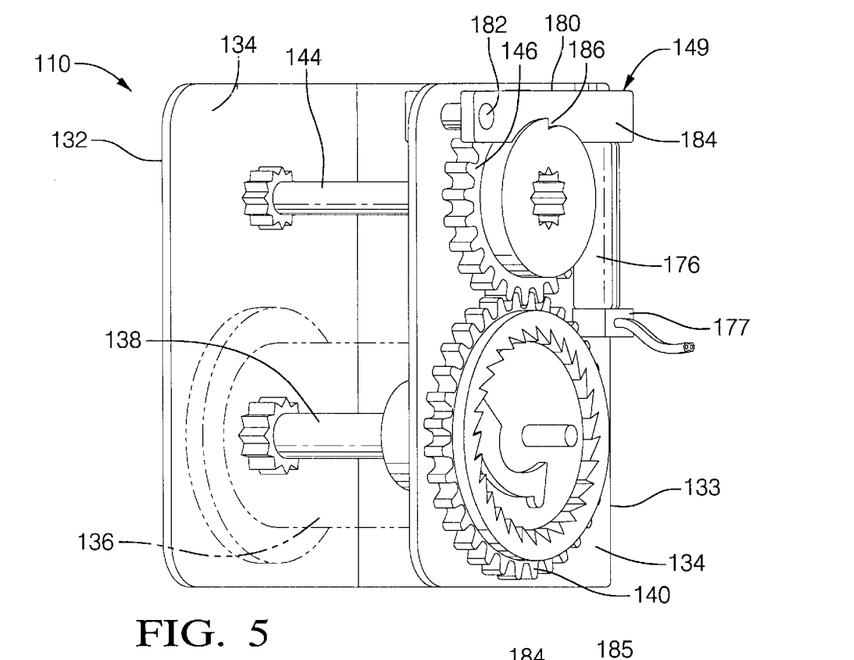
FIG. 5 is a perspective view of another embodiment, according to the present invention, of the selectable load limiting seat restraint retractor of FIG. 1 in a first operational state.

In operation of the selectable load limiting seat restraint retractor 110, an occupant (not shown) grasps the latch plate 23 and pulls on the lap belt 24 and shoulder belt 26. The shoulder belt 26 is unwound by the occupant from the take-up spool 136. The occupant engages the latch plate 23 with the buckle assembly 28 to restrain the occupant in the seat 18. During normal vehicle operation, the take-up spool 136 is free to rotate in the housing 132.

When the vehicle 14 experiences a frontal impact or collision-indicating condition of at least a predetermined threshold level such as during braking, the rapid deceleration causes the occupant to move forward and place a load on the webbing attached to the selectable load limiting seat restraint retractor 110. When the vehicle or web sensing mechanism (not shown) actuates a locking cam (not shown), this cam moves or pivots the pawl 150 to engage the teeth 151 with the internal teeth 143 of the first gear 140. The first gear 140 is permanently engaged to the second gear 146, which is locked to the housing 132 via the detent member 154 and lock arm 180. Thus, the take-up spool 136 is kept from rotating and the retractor 110 is locked.

When an occupant requires a high level of load limiting, the vehicle or web sensing mechanism (not shown) actuates a locking cam (not shown), this cam moves or pivots the pawl 150 to engage its teeth 151 with the internal teeth 143 of the first gear 140. When the pawl 150 is engaged with the first gear 140, all gear movement is locked. The second gear 146 is held fixed to the housing 132 by the lock arm 180 and detent member 154. This prevents rotation of the gear train. As webbing is pulled from the take-up spool 136, the first torsion bar 138 is twisted between the locked first gear 140 and the inside of the take-up spool 136, resulting in deformation of the first torsion bar 138 and the high level load limiting. It should be appreciated that the first torsion bar 138 is twisted between end points, that is the first gear 140 attached to the first torsion bar 138, which is fixed, the second gear 146 attached to the second torsion bar 144, which is fixed, and to the detent member 154 and the lock arm 180, which is fixed to the housing 132.

Figure 6:
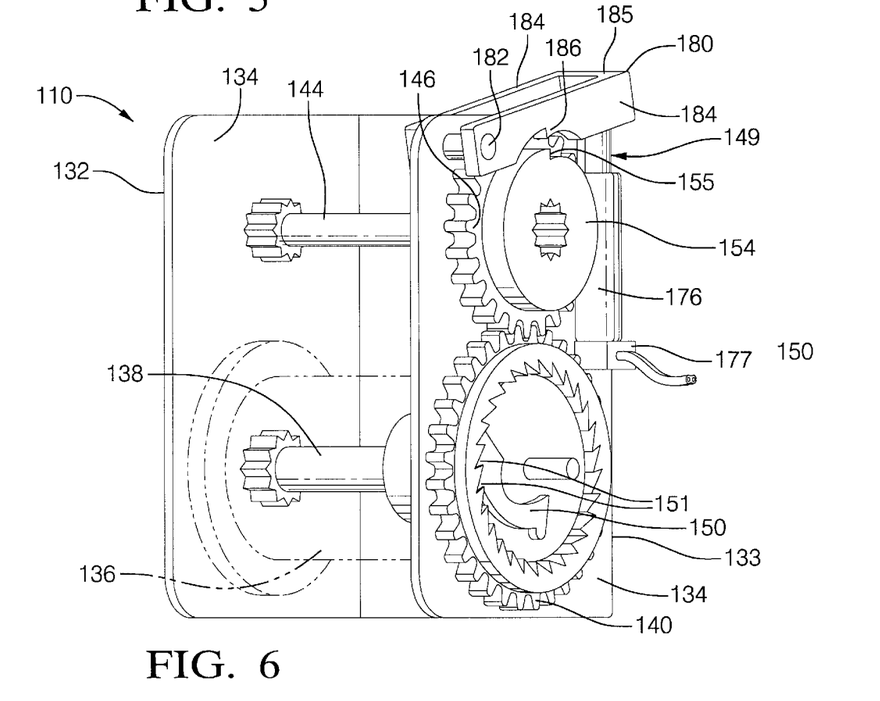
FIG. 6 is a view similar to FIG. 5 illustrating the selectable load limiting seat restraint retractor in a second operational state.
Figure 7:
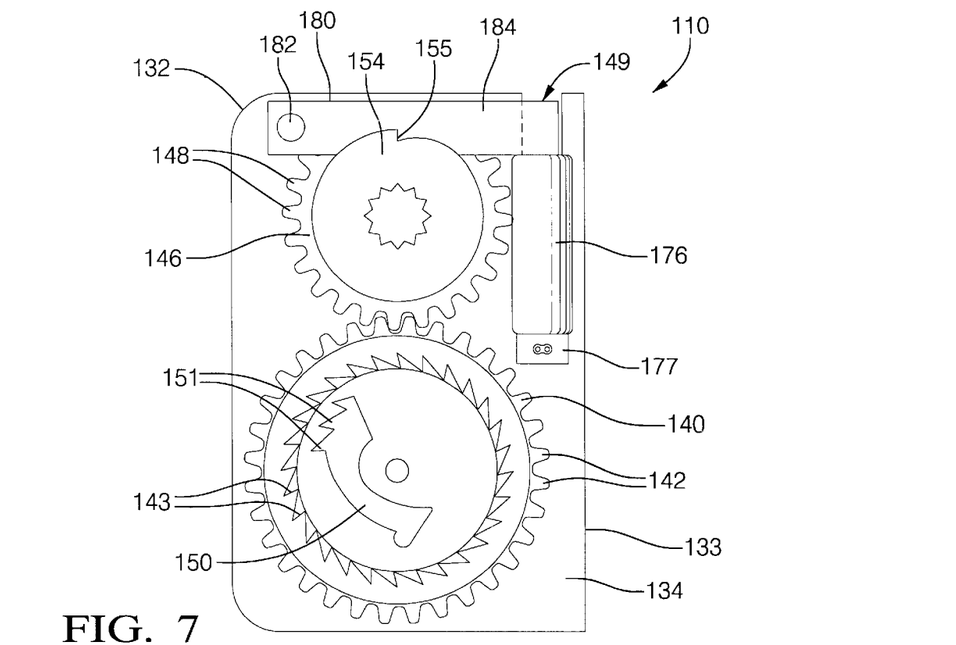
FIG. 7 is a side elevational view of the selectable load limiting seat restraint retractor of FIG. 5.
Figure 8:
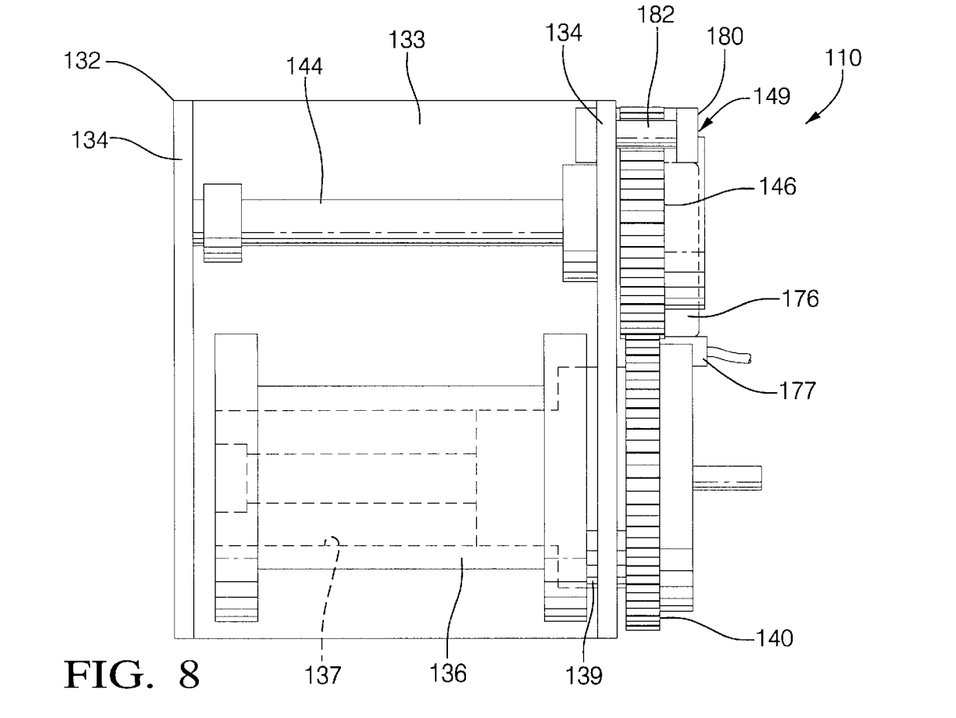
FIG. 8 is a front elevational view of the selectable load limiting seat restraint retractor of FIG. 5.

When a low level of load limiting is required, the vehicle or web sensing mechanism (not shown) actuates a locking cam (not shown), this cam moves or pivots the pawl 150 to engage its teeth 151 with the internal teeth 143 of the first gear 140. The gas generator 176 is fired which moves the piston 178 to pivot the lock arm 180 and release the lock arm 180 from the detent member 154 attached to the second gear 146. This allows rotation of the first gear 140, second gear 146, and detent member 154. The second torsion bar 144 is rotationally fixed by the housing 132 on one end. Thus, the rotation of the take-up spool 136 about the first torsion bar 138 is translated through the gear train to the second torsion bar 144 and twisting occurs between the top end of the second torsion bar 144 and its attachment to the housing 132. Because the second torsion bar 144 is rated for a low level of load limiting, the second torsion bar 144 will undergo twisting before the first torsion bar 138, resulting in a low level of load limiting provided to the occupant. It should be appreciated that the first torsion bar 138 rotates, first gear 140 attached to the bobbin 139, which is attached to the first torsion bar 138 rotates, the second gear 146 attached to second torsion bar 144 rotates, and the second torsion bar 144 twists between end points, that is the end of the second torsion bar 144, which is fixed to the housing 132. It should also be appreciated that the selectable load limiting seat restraint retractor 110 has digressive load limiting to payout seat belt webbing and allow the occupant to decelerate with the vehicle 14. It should further be appreciated that the locking pawl 150 may be disengaged by the squib at a specific time or webbing value to allow the gear train to rotate under belt load and allow the second torsion bar 144 to payout.

Accordingly, the selectable load limiting seat restraint retractor 110 includes the lock arm 180 and detent member 154, which may be in tension or compression. The selectable load limiting seat restraint retractor 110 includes the gears 140 and 146, allowing either gear 140 or 146 to be locked. The selectable load limiting seat restraint retractor 110 may include an idler gear (not shown) to be used for locking in addition to the gears 140 and 146. It should be appreciated that the selectable load limiting seat restraint retractor 110 may use other locking means such as a locking pin or direct to gear locking.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A selectable load limiting seat restraint retractor for a seat restraint system in a vehicle comprising:

a first housing for operative connection to vehicle structure;

a rotatable take-up spool connected to a webbing of a seat restraint system for winding and unwinding the webbing;

a rotatable first torsion bar operatively connected to said first housing to provide a first level of load limiting on the webbing during an impact, said take-up spool being operatively connected to said first torsion bar;

a rotatable second torsion bar operatively connected to said first housing and orientated parallel to said first torsion bar to provide a second level of load limiting on the webbing during an impact, said second level of load limiting being less than said first level of load limiting; and a selectable load limiting mechanism operatively cooperating with said first torsion bar and said second torsion bar to select between said first level of load limiting and said second level of load limiting to provide digressive load limiting on the webbing during the impact.

2. A selectable load limiting seat restraint retractor as set forth in claim 1 including a first gear connected to said first torsion bar.

3. A selectable load limiting seat restraint retractor as set forth in claim 2 including a second gear connected to said second torsion bar.

4. A selectable load limiting seat restraint retractor as set forth in claim 3 wherein said selectable load limiting mechanism includes a pawl for engagement and disengagement with said first gear.

5. A selectable load limiting seat restraint retractor as set forth in claim 4 wherein said pawl comprises at least one arm member connected to said second torsion bar and a third gear connected to said at least one arm.

6. A selectable load limiting seat restraint retractor as set forth in claim 1 including a second housing connected to said first housing.

7. A selectable load limiting seat restraint retractor as set forth in claim 6 including a movable piston disposed in said second housing.

8. A selectable load limiting seat restraint retractor as set forth in claim 7 including a pin extending from said piston and through said second housing.

9. A selectable load limiting seat restraint retractor as set forth in claim 8 including a first aperture extending through said first housing and a second aperture extending through said second housing, said pin extending through said first aperture and said second aperture and into said second gear.

10. A selectable load limiting seat restraint retractor as set forth in claim 6 including a gas generator connected to said second housing to actuate said piston.

11. A selectable load limiting seat restraint retractor as set forth in claim 10 wherein said gas generator comprises a pyrotechnic device to expel a gas.

12. A load limiting seat restraint retractor as set forth in claim 1 wherein said take-up spool is disposed over said first torsion bar and connected to the webbing, said take-up spool being operatively connected to said first torsion bar.

13. A selectable load limiting seat restraint retractor as set forth in claim 1 including a first gear operatively connected to said first torsion bar, said first gear having a plurality of internal teeth and external teeth.

14. A selectable load limiting seat restraint retractor as set forth in claim 13 including a second gear connected to said second torsion bar, said second gear having a plurality of external teeth engaging said external teeth of said first gear.

15. A selectable load limiting seat restraint retractor as set forth in claim 14 wherein said selectable load limiting mechanism includes a detent member connected to said second gear.

16. A selectable load limiting seat restraint retractor as set forth in claim 15 wherein said selectable load limiting mechanism includes a lock arm for engagement and disengagement with said detent member.

17. A selectable load limiting seat restraint retractor as set forth in claim 16 wherein said lock arm comprises at least one arm member connected to said first housing and having a protrusion engageable and disengageable with a detent in said detent member.

18. A selectable load limiting seat restraint retractor as set forth in claim 16 including a gas generator having a movable piston to actuate said lock arm.

19. A selectable load limiting seat restraint retractor as set forth in claim 18 wherein said gas generator includes a pyrotechnic device to expel a gas.

20. A selectable load limiting seat restraint retractor as set forth in claim 13 wherein said selectable load limiting mechanism includes a pawl having teeth for engagement and disengagement with said internal teeth of said first gear.

21. A load limiting seat restraint retractor as set forth in claim 13 including a locking bobbin disposed around said first torsion bar and connected to said take-up spool, said first gear being disposed around to said locking bobbin.

22. A load limiting seat restraint retractor for a seat restraint system in a vehicle comprising:

a first housing for operative connection to vehicle structure;

a rotatable take-up spool connected to a webbing of a seat restraint system for winding and unwinding the webbing;

a rotatable first torsion bar operatively connected to said first housing to provide a first level of load limiting on the webbing during an impact, said take-up spool being operatively mounted on said first torsion bar;

a rotatable second torsion bar operatively connected to said first housing and orientated parallel to said first torsion bar to provide a second level of load limiting on the webbing during an impact, said second level of load limiting being less than said first level of load limiting; and a first gear operatively connected to said first torsion bar;

a second gear operatively connected to said second torsion bar; and a selectable load limiting mechanism cooperating with said first gear and said second gear to select between said first level of load limiting and said second level of load limiting to provide digressive load limiting on the webbing during the impact.

23. A load limiting seat restraint retractor as set forth in claim 22 wherein said selectable load limiting mechanism includes a pawl for engagement and disengagement with said first gear and said second gear.

24. A load limiting seat restraint retractor as set forth in claim 23 wherein said pawl comprises a pair of arm members connected to said second torsion bar.

25. A load limiting seat restraint retractor as set forth in claim 24 wherein said pawl further comprises a third gear connected to said arms.

26. A load limiting seat restraint retractor as set forth in claim 22 including a second housing connected to said first housing.

27. A load limiting seat restraint retractor as set forth in claim 26 including a movable piston disposed in said second housing.

28. A load limiting seat restraint retractor as set forth in claim 27 including a pin extending from said piston and through said second housing.

29. A load limiting seat restraint retractor as set forth in claim 28 including a first aperture extending through said first housing and a second aperture extending through said second housing, said pin extending through said first aperture and said second aperture and into said second gear.

30. A load limiting seat restraint retractor as set forth in claim 27 including a gas generator connected to said second housing to actuate said piston.

31. A selectable load limiting seat restraint retractor as set forth in claim 22 including a first gear operatively connected to said first torsion bar, said first gear having a plurality of internal teeth and external teeth.

32. A selectable load limiting seat restraint retractor as set forth in claim 31 including a second gear connected to said second torsion bar, said second gear having a plurality of external teeth engaging said external teeth of said first gear.

33. A selectable load limiting seat restraint retractor as set forth in claim 32 wherein said selectable load limiting mechanism includes a detent member connected to said second gear.

34. A selectable load limiting seat restraint retractor as set forth in claim 33 wherein said selectable load limiting mechanism includes a lock arm for engagement and disengagement with said detent member.

35. A selectable load limiting seat restraint retractor as set forth in claim 34 wherein said lock arm comprises at least one arm member connected to said first housing and having a protrusion engageable and disengageable with a detent in said detent member.

36. A selectable load limiting seat restraint retractor as set forth in claim 34 including a gas generator having a movable piston to actuate said lock arm.

37. A selectable load limiting seat restraint retractor as set forth in claim 36 wherein said gas generator includes a pyrotechnic device to expel a gas.

38. A selectable load limiting seat restraint retractor as set forth in claim 31 wherein said selectable load limiting mechanism includes a pawl having teeth for engagement and disengagement with said internal teeth of said first gear.

39. A load limiting seat restraint retractor as set forth in claim 31 including a locking bobbin disposed over said first torsion bar and connected to said take-up spool, said first gear being disposed over said locking bobbin.

40. A seat restraint system for a vehicle comprising:

a belt webbing;

a retractor housing for operative connection to vehicle structure;

a rotatable take-up spool connected to a webbing of a seat restraint system for winding and unwinding the webbing;

a rotatable first torsion bar operatively connected to said retractor housing to provide a first level of load limiting on the webbing during an impact, said take-up spool being operatively mounted on said first torsion bar;

a rotatable second torsion bar operatively connected to said retractor housing and orientated parallel to said first torsion bar to provide a second level of load limiting on said belt webbing during an impact, said second level of load limiting being less than said first level of load limiting; and a selectable load limiting mechanism cooperating with said first torsion bar and said second torsion bar to select between said first level of load limiting and said second level of load limiting to provide digressive load limiting on said belt webbing during the impact.

* * * * *